United States Patent Office 3,801,529
Patented Apr. 2, 1974

3,801,529
BLOCK COPOLYMER-POLYVINYL CHLORIDE
COMPOSITIONS
Richard C. Potter, Modesto, Calif., assignor to
Shell Oil Company
No Drawing. Continuation of abandoned application Ser.
No. 94,550, Dec. 2, 1970. This application Feb. 12,
1973, Ser. No. 331,917
Int. Cl. C08f 45/50
U.S. Cl. 260—30.6 R    3 Claims

ABSTRACT OF THE DISCLOSURE

The processability of polyvinyl chloride resins is substantially improved by blending therewith a minor proportion of certain block copolymers, the two components having improved compatibility by the presence of certain monomeric plasticizers having a solubility parameter between about 8.0 and 11.0.

---

This is a continuation of application Ser. No. 94,550, filed Dec. 2, 1970 now abandoned.

BACKGROUND OF THE INVENTION

Polyvinyl chloride (PVC) resin is used for many commercial purposes in the preparation of objects by molding or casting techniques. It is useful as a fire resistant resin and is employed in the manufacture of shoe soling and the like. However, the physical properties of polyvinyl chloride are such that it is a difficult material to process, because of its thermal sensitivity and high viscosity. Moreover it exhibits a high degree of wet slip as a shoe soling material. In certain applications a higher degree of elasticity is also desired in PVC products.

The modification of resins based on polyvinyl chloride with certain rubbery materials would be desirable to alleviate or correct the shortcomings just referred to. However, most rubbers and particularly block copolymer rubbers have been found to be substantially incompatible with resins based on polyvinyl chloride. Thus, up to the present time it has not been possible to modify polyvinyl chloride resins with the block copolymers more fully described hereinafter.

It is an object of the present invention to provide improved compositions comprising resins based on polyvinyl chloride. It is a further object of the invention to provide improved polyvinyl chloride compositions having substantially improved processability and other associated properties. It is also an object of the invention to provide improved fire resistance to compositions. Other objects will become apparent during the following detailed description of the invention.

DESCRIPTION OF THE INVENTION

Now, in accordance with the present invention, improved PVC based compositions are provided comprising a polyvinyl chloride resin, 1–30% by weight thereof of certain block copolymers as detailed further hereinafter and an amount of at least one monomeric plasticizer or mixture of monomeric plasticizers at least sufficient to form an essentially compatible composition of the resin and block copolymer, said plasticizer or mixtures thereof having a solubility parameter between about 8.0 and 11.0 Hildebrand units.

The compositions of this invention are not only highly desirable with respect to the substantially improved processability of the polyvinyl chloride resin, but also their properties are highly unexpected since there is no known means for predicting the compatibility of the present compositions. The modification of polyvinyl chloride resins with the block copolymers and the defined class of plasticizers results in compositions having substantially improved processing characteristics compared with compositions comprising only the polyvinyl chloride resin and plasticizer, no block copolymer being present. With the addition of the latter essential component, the ensuing flow improvement reduces die swell, increases through-put, improves conformity to die contours, allows a reduction in processing temperatures, permits a reduced quench time and results in a product which is both tough and elastic in nature.

The vinyl chloride resins comprising one of the several classes of polymers useful in compositions in accordance with this invention may be either homopolymeric polyvinyl chloride or its copolymers and are well known in the prior art. These include vinyl chloride-vinyl acetate copolymers, vinyl chloride-vinylidene chloride copolymers, vinyl chloride-fumarate copolymers, vinyl chloride-maleate copolymers, vinyl chloride-acrylic ester copolymers, vinyl chloride-acrylonitrile copolymers, vinyl chloride-alkyl vinyl ether copolymers, and vinyl chloride-olefin copolymers. These vinyl chloride copolymers may be either random, graft or block copolymers and may be either linear or branched in their configurations. While molecular weight does not form an essential aspect of the present invention, the usual molecular weight range is between about 20,000 and 500,000, normally between about 30,000 and 100,000. These vinyl chloride resins normally comprise about 30 to 80% by weight of the total composition.

The block copolymers especially useful in the present compositions are block copolymers of conjugated dienes with monovinyl arenes as well as the hydrogenated derivatives thereof, including block polymers in which alpha-mono-olefin polymer blocks may be used in place of or in addition to hydrogenated diene blocks. Normally, these will have at least one block A, comprising a mono-alpha-alkenyl arene polymer block, or its hydrogenated derivative, and at least one block B, comprising a conjugated diene polymer block, its hydrogenated derivative or the poly (alpha mono-olefin) equivalent of the latter. Where, in the specification and claims, reference is made to hydrogenated conjugated diene polymer blocks, this will be understood to include equivalent poly (alpha mono-olefin) blocks as well.

Preferably, the block copolymers have a general configuration of the group A—B$(A)_{0-1}$, A$(B—A)_{2-5}$ or A—B$(B—A)_{2-5}$, wherein each A and B is as defined above, it being understood that wherever adjacent polymer blocks are substantially identical, e.g., B—B, they are to be regarded as a single polymer block. The block copolymers may be either linear or branched in their configuration and are made by processes already known in the art of polymerization such as by solution polymerization involving lithium initiators. The proportion of A or B blocks in the block copolymer does not constitute an essential aspect of the present invention; however, where high impact or elastomeric properties are to be imparted to the composition, it is preferred that the block copolymer contain at least 50 weight percent of elastomeric polymer (B) blocks. However, block copolymers having more than 50% of thermoplastic (A) blocks are operable in the present compositions.

The monomers from which the blocks A may be formed are typified by styrene or alkylated styrene, especially alpha-methyl styrene. The conjugated dienes are represented by butadiene and isoprene, as well as their homologues having up to about 8 carbon atoms per molecule. While the individual block molecular weights are not an essential aspect of the present invention, the blocks A will normally have average molecular weights in the order of 5,000–100,000, preferably 10,000–50,000. The blocks B will usually have average molecular weights in the order of 30,000–500,000, usually 35,000–150,000. The following species are typical of the block copolymers contemplated, it being stressed that for the sake of simplicity in the following list only block copolymers having two or three blocks are specified.

polystyrene-polyisoprene
polystyrene-polybutadiene
poly(alphamethyl styrene)-polyisoprene
polystyrene-polyisoprene-polystyrene
polystyrene-polybutadiene-polystyrene In addition to these block copolymers as listed above, partially, i.e. selectively, or completely hydrogenated derivatives thereof may be employed in addition to or in place of the non-hydrogenated species. Preferably, if the polymer is selectively hydrogenated, any conjugated diene polymer blocks are hydrogenated while mono-alpha-alkenyl arene polymer blocks are essentially unaltered or have no more than about 25% of the theoretical reduction. The following species typify selectively hydrogenated block copolymers.

polystyrene-(hydrogenated polyisoprene)
polystyrene-(hydrogenated polybutadiene)
polystyrene-(hydrogenated polyisoprene)-polystyrene If the monovinyl arene polymer blocks are hydrogenated as well as the conjugated diene polymer blocks, the product so obtained may be typified by the following.

polyvinylcyclohexane-(hydrogenated polyisoprene)
polyvinyl cyclohexane-(hydrogenated polybutadiene)

Substantially equivalent block copolymers may be prepared in which hydrogenation steps may be avoided by block polymerizing a mono alpha-alkenyl arene with one or more alpha-mono-olefins. For example, hydrogenated polyisoprene blocks are regarded as being substantially equivalent to ethylene-propylene copolymer blocks wherein the ratio of the ethylene and propylene are essentially 1:1. Furthermore, suitable block polymers may be employed wherein the order of the blocks A and B are reversed from that given in the general formula set forth hereinabove so that the blocks A are interior blocks and the blocks B, either hydrogenated or non-hydrogenated, are end blocks. The generic formulae for such alternatives are as follows: B—A$(B)_{0-1}$, B—A$(A$—B$)_{2-5}$ and $(A$—B$)_{2-5}$.

The polyvinyl chloride resins and above-described block copolymers are converted into substantially compatible blends by the incorporation of substantial proportions of certain monomeric plasticizers or mixture of plasticizers found to be effective for this purpose. It has been found that these plasticizers are relatively restricted in scope. This is best defined by means of "solubility parameter" which should be between about 8.0 and 11.0, more preferably between about 8.5 and 10.0. If monomeric plasticizers or mixtures of plasticizers having solubility parameters either below or above these ranges are used, the resulting compositions show evidence of substantial amounts of bleeding or form compositions having comparatively poor physical properties and lacking in smooth surface of extrudates and the like. Plasticizers which have been found especially useful in the compositions of this invention are typified by the following:

| | Solubility parameter $\sqrt{cal./cc.}$ |
|---|---|
| Dibutyl phthalate | 9.3 |
| Diamyl phthalate | 9.1 |
| Dibutyl phenyl phosphate | 8.7 |
| Dibutyl sebacate | 9.2 |
| Dibutoxyethyl phthalate | 8.0 |
| Diethyl carbonate | 8.8 |
| Diethyl oxalate | 8.6 |
| Diethyl phthalate | 10.0 |
| Di-n-hexyl phthalate | 8.9 |
| Dimethyl 1 - (2,4,5-trichlorophenyl)-2-chlorovinyl phosphate | 10.9 |
| Dimethyl 1-methyl - 2 - (dimethylcarbamoyl)vinyl phosphate | 10.7 |
| Dioctyl adipate | 8.7 |
| Dioctyl sebacate | 8.6 |
| Diphenyl 2-ethylhexyl phosphate | 8.6 |
| Dipropyl phthalate | 9.7 |
| Dioctyl phthalate | 8.9 |
| Tributoxyethyl phosphate | 8.6 |
| Triphenyl phosphate | 8.6 |
| Tricresyl phosphate | 8.4 |
| Tri-n-butyl phosphate | 8.5 |

From the above list of typical species, it will be seen that most of the solubility parameters lie in the area between about 8.5 and 10.0. Generally, they comprise esters of phosphorus acids and esters formed between monohydric alcohols and dicarboxylic acids. Phosphates are preferred, and, of these, some of the more desirable are trialkoxy alkyl phosphates.

The solubility parameters referred to above are given in terms of Hildebrand units. This term is described in the literature as being the square root of the ratio of the energy of vaporization to molar volume. See Journal of Paint Technology, vol. 38, No. 496, May 1966, pages 269–280.

The compositions of this invention may contain other suitable, but not necessarily essential, components such as odorants, colorants, supplementary plasticizers, oil, or other extenders, pigments and other polymers such as polystyrene or polyalphamethylstyrene and stablizers for any of the above referred to components.

The most effective compositions of the present invention have the following proportions of the essential components: polyvinyl chloride resin, 30–85% (preferably 40–60%) by weight; block copolymer, 1–25% (preferably 2–15%) by weight; monomeric plasticizer, 10–60% (preferably 30–60%) by weight.

The presence of the block copolymer in the compositions of the present invention imparts substantial advantages heretofore not attainable. The elastomeric blocks reduce the stiffness of the plastic matrix, thereby making it more flexible and readily formed into different shapes.

Another important advantage caused by the presence of block copolymers in these novel compositions lies in the fact that the compositions containing the block copolymers are stable and dry, i.e., they are free from the exudation, dripping or bleeding of plasticizer and its decomposition products from the surface which is sometimes observed in prior art compositions.

The presence of a block copolymer in compositions of the present invention imparts a number of functional advantages going especially to the processing of the compositions. The block copolymer surprisingly enough acts as a flow promoter for the plasticized polyvinyl chloride resin. This flow promotion effect is believed to be brought about by the affinity the plasticizer has for the polyarene or block A portion of the block copolymer. In processing, intimate contact between the plasticizer and block A polymer results in a loosening of the entire block copolymer network. Although the block copolymer is but a minor portion of the whole composition, this loosening effect for some reason, not fully understood, permits the whole composition to flow more easily than it would in the absence of block copolymer. This loosening effect results in a decrease in viscosity of the molten composition. One skilled in the art would know how to use this decrease in viscosity to improve the throughput and reduce the processing temperature of the molten mass through an extruder or the like. As a result of the present invention, the throughput in processing equipment is considerably enhanced, thus providing greater plant capacity without plant enlargement. The material readily fills any extruder die shape and emerges with a smooth surface and uniform cross section and minimal die swell.

A further consequence of the presence of the block copolymer is the reduction in temperature required to produce flow of the plastic mass. Due to the lower temperature requirements for flow and high die profile conformity, it is possible to extrude profiles at a lower extruder die temperature having thicknesses which would be impossible to extrude if the block copolymer were absent. If the block copolymer were absent, higher die temperatures would have to be employed in order to achieve flow. Moreover, the block copolymer modified material surprisingly cools faster than the unmodified mass. An additional advantage associated with the lower temperature requirements is the increase in the quenching rate of the plastic mass coming through the extruder. Because the quenching rates are increased, a reduction in size of cooling equipment is possible.

Perhaps the most surprising aspect of this invention is that the block copolymer and polyvinyl chloride resins should be technologically compatible, i.e., that mixtures may be fabricated by extrusion, etc., to produce articles with good mechanical strength. It is unexpected that mixtures of vinyl resins and block copolymers are sufficiently compatible to be readily processable and capable of being formed into useful articles. The plasticizer operates in some way to bring the polyvinyl chloride resin and block copolymer together in a stable mixture. Such technological compatibility is unexpected and could not be predicted from the prior art.

The preparation of the compositions of the invention is achieved by the conventional methods. Because of the unexpected technological compatibility of the three basic components, namely, the plasticizer, polyvinyl chloride resin and block copolymer, the compositions may be prepared merely by mechanical mixing of the plasticizer with the resin and copolymer. This mixture may be further processed, for example, plastisols may be made which can be molded, extruded, cast, or otherwise formed into such shapes as rods, sheets, granules, blocks, foams and the like. Alternatively, the plasticizer may be incorporated in the resin and block copolymer by milling, by the use of mutual solvents, or by similar blending techniques.

One special aspect coming within the generic scope of the present invention, comprises the use as a plasticizer of certain volatile biocidal phosphates. Contrasted to the other types of plasticizers contemplated herewith, some of the biocidal phosphates are characterized by having a vapor pressure sufficient to gradually evolve from the compositions of this invention to provide a biocidal concentration in the surrounding atmosphere. Compositions containing such volatile biocidal phosphates are specifically claimed in copending application, Ser. No. 253,583, filed on May 15, 1972. The presence of the block copolymer in such compositions has been found to have an unexpected effect in controlling the rate of evolution of the biocides from these compositions. The block copolymers, in fact, substantially increase the diffusion coefficient of the biocides therefrom as compared with comparable compositions from which the block copolymers have been omitted. While the scope of the biocidal phosphates especially contemplated in this particular end use are given in great detail in the copending application referred to above, the most preferred class thereof comprises halogenated phosphates and especially the alkylated halovinyl phosphates, specifically dimethyl 2,2-dichlorovinyl phosphate.

Another aspect of the present invention comprises the formulation of fire resistant compositions. While polyvinyl chloride resins are known to be fire resistant, and phosphates are recommended as fire resistant plasticizers, it is now possible to improve these compositions by the additional presence of block copolymers, preferably modified by selective halogenation or hydrohalogenation in any diene polymer blocks. Thus, the selective hydrohalogenation of a block copolymer such as polystyrene-polybutadiene-polystyrene results in hydrohalogenation of the diene block, the polystyrene block being substantially unaffected. Such compositions may be still further improved by the additional presence of antimony oxide or other fire resistant pigments.

A still further advantage of the invention comprises the improvement in low temperature flexibility of the polyvinyl chloride resins by the presence of minor amounts of the subject classes of block copolymers. The major benefit gained by the use of the block copolymers in these compositions, however, resides in the substantially improved processability so gained.

The following examples illustrate the advantages of the present invention.

The polyvinyl chloride resins used in the examples were homopolymers of vinyl chloride and are identified in terms of Inherent Viscosity (IV) as determined by ASTM test D 1243–60 Method A. These resins are referred to in the examples as follows:

| Polyvinyl chlorides: | IV |
|---|---|
| #1 | 1.1 |
| #2 | 1.1 |
| #3 | 1.0 |

EXAMPLE I

Comparative formulations were prepared and passed through a Brabender 0.75 inch extruder fitted with a ⅛ inch strand die. The control formulation contained the following components:

| | Percent by weight |
|---|---|
| Tricresyl phosphate | 50 |
| Polyvinyl chloride #3 | 48 |
| PVC stabilizers | 2 |

For comparison, this above composition was modified by replacement of 10% by weight basis total composition, of the polyvinyl chloride with a block copolymer having the structure polystyrene-polybutadiene-polystyrene, the block molecular weights of which were 9,500–51,500–9,500. The Brabender extruder was run under essentially identical temperature conditions for both samples, the temperature settings varying from 200 to 300° F. in the apparatus at 75 r.p.m. The block copolymer composition exerted only a die pressure of 600 p.s.i. during extrusion as compared with a die pressure of 1,450 for the control formulation. Moreover, the sample containing the block polymer was extruded under these conditions at a rate of 41.5 grams per minute as compared with 36 grams per minute for the control sample.

EXAMPLE II

A pair of comparative formulations was treated through the same Brabender extruder under identical temperature settings which varied from 300 to 400° F. at 60 r.p.m. The control formulation was as follows:

| | Percent by weight |
|---|---|
| Dibutyl sebacate | 20 |
| Polyvinyl chloride #1 | 76 |
| PVC stabilizers | 4 |

The composition of the present invention was prepared by reducing the proportion of polyvinyl chloride in the above composition to 66% by weight and replacing with 10% by weight of a block copolymer having the structure polystyrene polyisoprene-polystyrene, the block molecular weights of which were 10,000–125,000–10,000. It was found that the strand of the control composition when extruded was poorly fused and swollen (0.22 inch diameter). The block copolymer formulation of this invention, however, was well fused and had substantially less die swell (0.18 inch diameter).

EXAMPLE III

Comparative compositions were extruded from a 2 inch Prodex having a sheet die ½ inch thick by 6 inch in width. The temperature conditions were identical for both samples, varying from a die temperature of 240° F. to a rear temperature of 340° F. The extruder was run at 60 r.p.m. The control sample had the following formulation:

| | Percent by weight |
|---|---|
| Dimethyl 1 - (2,4,5 - trichlorophenyl) - 2-chlorovinyl phosphate | 35 |
| Polyvinyl chloride #1 | 62 |
| PVC stabilizers | 3 |

In the comparative sample, according to the present invention, the polyvinyl chloride content was reduced by 10% by weight which was replaced by an equal amount of the following composition:

| | Percent by weight |
|---|---|
| Block copolymer | 46 |
| Oil | 32 |
| Polystyrene | 15 |
| Calcium carbonate filler | 7 |

The block copolymer had the structure polystyrene-polybutadiene-polystyrene, the block molecular weights being 14,000–57,000–14,000.

The advantage of the added block copolymer was apparent with respect to die pressure (2,300 p.s.i.) as compared with 3,000 for the control sample. The block copolymer-modified formulation flowed satisfactorily and completely filled the die. The surface of the extrudate was smooth. The control formulation did not fill the die and flowed poorly, the surface being very rough. Both compositions were cooled in air. The block copolymer-modified composition showed only a slight color change from white to light tan, whereas the control sample was black and charred.

EXAMPLE IV

A number of compositions were prepared and processed in a Brabender Torque rheometer, model PL–V300 having a roller blade measuring head. The temperature (except where noted) in all cases was 300° F. at 90 r.p.m. The control composition was as follows:

| | Percent by weight |
|---|---|
| Plasticizer | 42 |
| Polyvinyl chloride #2 | 55 |
| PVC stabilizers | 3 |

Comparable block copolymer formulations according to the present invention were made by reducing the amount of polyvinyl chloride in the above composition by 10% by wt. replacing the withdrawn material with an equal amount of a block copolymer having the structure polystyrene-polybutadiene-polystyrene, the block molecular weights being 14,000–65,000–14,000. Viscosity reduction effected by the presence of the block copolymer is indicated by the lower torque obtained in comparison with the control formulations when the same plasticizers were utilized. The data are given in the following table.

| Plasticizer | Torque (meter-gram) Base formulation | Torque (meter-gram) Block copolymer formulation |
|---|---|---|
| Tirbutoxyethyl phosphate | 1,420 | 800 |
| Dibutyl phthalate | 1,070 | 1,020 |
| Tricresyl phosphate | 1,110 | 1,000 |
| Dioctyl adipate | 580 | 560 |
| Triphenyl phosphate | 1,050 | 940 |
| Dibutyl sebacate | 1,240 | 570 |
| Diethyl phthalate | 1,040 | 980 |
| Dimethyl 1-(2,4,5-trichlorophenyl)-2-chlorovinyl phosphate | 1,760 | 1,020 |
| Dioctyl adipate | ¹ 500 | ¹ 430 |
| Tributoxyethyl phosphate | ¹ 660 | ¹ 430 |

¹ 340° F., 90 r.p.m.

EXAMPLE V

Improved throughput of the compositions of this invention was demonstrated by the following comparative experiments, utilizing the above described Brabender ¾ inch extruder fitted with a ⅛ inch strand die. The control formulation was as follows:

| | Percent by weight |
|---|---|
| Plasticizer | 42 |
| Polyvinyl chloride #2 | 55 |
| PVC stabilizers | 3 |

The comparative compositions of this invention were prepared by reducing the proportion of polyvinyl chloride in the above formulation by 10% by wt., replacing the removed polymer with an equal amount of a block copolymer which was identical with that employed in the previous example. The extruder was run at 90 r.p.m. at temperatures varying from 240 to 340° F., the die pressure and throughput for the comparative examples with two different plasticizers being given in the table below:

| Plasticizer | Die pressure (p.s.i.) Base Formulation | Die pressure (p.s.i.) Block copolymer formulation | Throughput 2/min. Base Formulation | Throughput 2/min. Block copolymer formulation |
|---|---|---|---|---|
| Dioctyl adipate | 500 | 200 | 32.0 | 44.5 |
| Tributoxyethyl phosphate | 900 | 650 | 50 | 58.5 |

EXAMPLE VI

The useful block copolymer range is demonstrated by the following formulations:

(A): Percent by weight
| | |
|---|---|
| Dioctyl phthalate | 35 |
| PVC stabilizers | 3 |
| Block copolymer | 1 |
| Polyvinyl chloride #1 | 61 |

(B):
| | |
|---|---|
| Tributoxyethyl phosphate | 30 |
| PVC stabilizers | 3 |
| Block copolymer | 30 |
| Polyvinyl chloride #2 | 37 |

The formulations were passed through a Brabender extruder in the manner described in Example I. The block copolymer was the same as used in Examples IV and V. The extruder was run at 90 r.p.m. for both formulations and at temperature settings of from 280–340° F. for formulation A and 360–440° F. for formulation B. Smooth, whitish, translucent strands were obtained for both formulations. Formulation B was particularly elastic in nature.

I claim as my invention:
1. A composition comprising
  (a) 30–85% by weight of a polyvinyl chloride resin;
  (b) 1–30% by weight thereof of a block copolymer having at least one elastomeric polymer block of the group consisting of polymerized conjugated dienes, hydrogenated derivatives thereof, halogenated and hydrohalogenated derivatives thereof and α-olefin copolymers, and at least one thermoplastic block of the group consisting of polymerized mono-alpha- alkenyl arenes, hydrogenated derivatives thereof and α-olefin polymers;
(c) and 10–60% by weight of dimethyl 1-(2,4,5-trichlorophenyl)-2-chlorovinyl phosphate.

2. A composition according to claim 1 wherein the resin is polyvinyl chloride.

3. A composition according to claim 1 wherein the block copolymer has the general configuration A—B(A)$_{0-1}$, A(B—A)$_{2-5}$ or A—B(B—A)$_{2-5}$; each A is a thermoplastic polymer block and each B is an elastomeric polymer block.

References Cited
UNITED STATES PATENTS

| | | | |
|---|---|---|---|
| 3,695,477 | 10/1972 | Edmonston | 260—876 B |
| 3,005,796 | 10/1961 | Dreisbach et al. | 260—30.6 R |
| 3,441,530 | 4/1969 | Bayer et al. | 260—876 B |
| 3,639,163 | 2/1972 | Bishop et al. | 260—876 B |
| 3,429,951 | 2/1969 | Childers | 260—876 B |
| 3,557,252 | 1/1971 | Hsieh et al. | 260—876 B |
| 3,265,765 | 8/1966 | Holden et al. | 260—876 B |
| 3,102,842 | 9/1963 | Phillips et al. | 260—957 |
| 3,201,364 | 8/1965 | Salyer | 260—33.6 |

OTHER REFERENCES

Modern Plastics Encyclopedia 1967, September 1966, vol. 44, No. 1A, pp. 418, 419 and 428–431, TP986.-AZM5C.3.

Burrell, Harry; Solubility Parameters For Film Formers, In Official Digest, October 1955, page 745.

ALLAN LIEBERMAN, Primary Examiner
J. H. DERRINGTON, Assistant Examiner

U.S. Cl. X.R.

260—31.8 M, 876 B; 424—78, 83, 219